US011361034B1

(12) United States Patent
Kulkarni et al.

(10) Patent No.: US 11,361,034 B1
(45) Date of Patent: Jun. 14, 2022

(54) REPRESENTING DOCUMENTS USING DOCUMENT KEYS

(71) Applicant: Icertis, Inc., Bellevue, WA (US)

(72) Inventors: Yogesh Haribhau Kulkarni, Pune (IN); Sunu Engineer, Pune (IN); Amitabh Jain, Pune (IN); Ravi Kothari, New Delhi (IN); Monish Mangalkumar Darda, Pune (IN)

(73) Assignee: Icertis, Inc., Bellevue, WA (US)

( * ) Notice: Subject to any disclaimer, the term of this patent is extended or adjusted under 35 U.S.C. 154(b) by 0 days.

(21) Appl. No.: 17/538,852

(22) Filed: Nov. 30, 2021

(51) Int. Cl.
  *G06F 16/93* (2019.01)

(52) U.S. Cl.
  CPC .................... *G06F 16/93* (2019.01)

(58) Field of Classification Search
  CPC .............. G06F 16/93; G06N 20/00
  See application file for complete search history.

(56) References Cited

U.S. PATENT DOCUMENTS

| | | | |
|---|---|---|---|
| 6,505,195 B1 | 1/2003 | Ikeda et al. | |
| 7,519,589 B2 | 4/2009 | Charnock et al. | |
| 7,617,164 B2 | 11/2009 | Burges et al. | |
| 7,689,531 B1 | 3/2010 | Diao et al. | |
| 8,411,935 B2 | 4/2013 | Eaton et al. | |
| 8,429,103 B1 | 4/2013 | Aradhye et al. | |
| 8,626,682 B2 | 1/2014 | Malik et al. | |
| 8,868,472 B1 | 10/2014 | Lin et al. | |
| 8,965,814 B1 | 2/2015 | Rangan | |
| 9,235,812 B2 | 1/2016 | Scholtes | |
| 9,384,450 B1 | 7/2016 | Cordes et al. | |
| 9,922,285 B1 | 3/2018 | Glode et al. | |
| 10,133,791 B1 | 11/2018 | Chan | |
| 11,157,475 B1 * | 10/2021 | Cobb | G06F 40/30 |

(Continued)

FOREIGN PATENT DOCUMENTS

| | | |
|---|---|---|
| EP | 1946254 B1 | 2/2012 |
| WO | 2009061917 A1 | 5/2009 |
| WO | 2018042548 A1 | 3/2018 |

OTHER PUBLICATIONS

Office Communication for U.S. Appl. No. 15/949,905 dated Jun. 27, 2018, pp. 1-19.

(Continued)

*Primary Examiner* — Hau H Hoang
(74) *Attorney, Agent, or Firm* — John W. Branch; Branch Partners PLLC

(57) ABSTRACT

Embodiments are directed to representing documents using document keys. Documents that include one or more clauses may be provided. Each clause type for the one or more clauses in documents may be determined based on one or more classification models. One or more clause identifiers may be associated with the one or more clauses based on one or more clause types of each clause. A document key may be generated for each document based on an ordered collection of the one or more clauses included in each document such that each clause identifier may be positioned in the document key based on an order of its location in a corresponding clause of a document. The documents may be analyzed based on comparisons of one or more document keys corresponding to the documents. One or more reports may be generated based on one or more results of the analysis.

26 Claims, 9 Drawing Sheets

(56) References Cited

U.S. PATENT DOCUMENTS

| | | |
|---|---|---|
| 2004/0103305 A1 | 5/2004 | Ginter et al. |
| 2005/0102130 A1 | 5/2005 | Quirk et al. |
| 2005/0108001 A1 | 5/2005 | Aarskog |
| 2005/0154692 A1 | 7/2005 | Jacobsen et al. |
| 2005/0228783 A1 | 10/2005 | Shanahan et al. |
| 2007/0087756 A1 | 4/2007 | Hoffberg |
| 2007/0239632 A1 | 10/2007 | Burges et al. |
| 2008/0101689 A1 | 5/2008 | Forman |
| 2008/0195577 A1 | 8/2008 | Fan et al. |
| 2008/0249764 A1 | 10/2008 | Huang et al. |
| 2008/0249999 A1 | 10/2008 | Renders et al. |
| 2009/0240539 A1 | 9/2009 | Slawson et al. |
| 2009/0326919 A1 | 12/2009 | Bean |
| 2011/0004578 A1 | 1/2011 | Momma et al. |
| 2011/0213804 A1 | 9/2011 | Lee et al. |
| 2011/0307422 A1 | 12/2011 | Drucker et al. |
| 2012/0023006 A1 | 1/2012 | Roser et al. |
| 2012/0117082 A1 | 5/2012 | Koperda et al. |
| 2012/0173477 A1 | 7/2012 | Coutts et al. |
| 2012/0215727 A1 | 8/2012 | Malik et al. |
| 2013/0031489 A1 | 1/2013 | Gubin et al. |
| 2013/0066818 A1 | 3/2013 | Assadollahi et al. |
| 2013/0238533 A1 | 9/2013 | Virkar et al. |
| 2014/0075004 A1 | 3/2014 | Van Dusen et al. |
| 2014/0156567 A1 | 6/2014 | Scholtes |
| 2014/0172416 A1 | 6/2014 | Soroker et al. |
| 2014/0172417 A1 | 6/2014 | Monk, II et al. |
| 2014/0201838 A1 | 7/2014 | Varsanyi et al. |
| 2014/0278755 A1 | 9/2014 | Eberl et al. |
| 2014/0280238 A1 | 9/2014 | Cormack et al. |
| 2014/0370480 A1 | 12/2014 | Sugibuchi et al. |
| 2015/0032645 A1 | 1/2015 | McKeown et al. |
| 2015/0120373 A1 | 4/2015 | Bajaj et al. |
| 2015/0254330 A1 | 9/2015 | Chan et al. |
| 2015/0278730 A1 | 10/2015 | Goldsmith et al. |
| 2015/0294246 A1 | 10/2015 | Guven Kaya et al. |
| 2015/0339572 A1 | 11/2015 | Achin et al. |
| 2015/0379429 A1 | 12/2015 | Lee et al. |
| 2016/0048655 A1 | 2/2016 | Maitra et al. |
| 2016/0071022 A1 | 3/2016 | Bruno et al. |
| 2016/0117589 A1 | 4/2016 | Scholtes |
| 2016/0162802 A1 | 6/2016 | Chickering et al. |
| 2016/0358099 A1 | 12/2016 | Sturlaugson et al. |
| 2017/0076304 A1 | 3/2017 | Toth et al. |
| 2017/0124487 A1 | 5/2017 | Szeto et al. |
| 2017/0308985 A1 | 10/2017 | Grom et al. |
| 2018/0039911 A1 | 2/2018 | Bezzubtseva et al. |
| 2018/0053114 A1 | 2/2018 | Adjaoute |
| 2018/0150454 A1 | 5/2018 | Sharma et al. |
| 2018/0268506 A1 | 9/2018 | Wodetzki et al. |
| 2018/0357714 A1 | 12/2018 | So et al. |
| 2019/0339684 A1 | 11/2019 | Cella et al. |
| 2020/0302016 A1* | 9/2020 | Aggarwal ............ G06V 30/413 |

OTHER PUBLICATIONS

Vellido, Alfredo et al., "Making machine learning models interpretable", ESANN 2012 proceedings, European Symposium on Artificial Neural Networks, Computational Intelligence and Machine Learning. Bruges (Belgium), Apr. 25-27, 2012, pp. 163-172.

Office Communication for U.S. Appl. No. 15/949,905 dated Nov. 7, 2018, pp. 1-30.
Office Communication for U.S. Appl. No. 16/231,886 dated Feb. 28, 2019, pp. 1-24.
GitHub, Inc., Accord Project—Specification, Template Specification, "https://github.com/accordproject/techdocs/blob/master/docs/accordproject-specification.md," accessed Sep. 2018, pp. 1-11.
Office Communication for U.S. Appl. No. 16/231,886 dated Jun. 21, 2019, pp. 1-23.
International Search Report and Written Opinion for International Patent Application No. PCT/US2019/026850 dated Aug. 1, 2019, pp. 1-9.
Office Communication for U.S. Appl. No. 16/279,974 dated Jul. 10, 2019, pp. 1-29.
Office Communication for U.S. Appl. No. 16/231,842 dated Jul. 29, 2019, pp. 1-10.
Freund, Yoav et al., "An Efficient Boosting Algorithm for Combining Preferences", Journal of Machine Learning Research, vol. 4, 2003, pp. 933-969.
Gibaja, Eva et al., "A Tutorial on Multilabel Learning", ACM Computing Surveys, vol. 47, No. 3, Article 52, Apr. 2015, pp. 52:1-52:38.
Office Communication for U.S. Appl. No. 16/279,9/4 dated Jan. 10, 2020, pp. 1-31.
Office Communication for U.S. Appl. No. 16/231,842 dated Feb. 4, 2020, pp. 1-12.
International Search Report and Written Opinion for International Patent Application No. PCT/US2019/066986 dated Mar. 17, 2020, pp. 1-8.
Office Communication for U.S. Appl. No. 16/279,974 dated Apr. 3, 2020, pp. 1-4.
Office Communication for U.S. Appl. No. 16/231,842 dated May 7, 2020, pp. 1-6.
Sun, Shiliang et al., "A Review of Natural Language Processing Techniques for Opinion Mining Systems", Information Fusion 26, 2017, pp. 10-25.
Office Communication for U.S. Appl. No. 16/279,974 dated May 14, 2020, pp. 1-9.
Catal, Cagatay et al., "A Systematic Review of Software Fault Prediction Studies," Expert Systems With Applications, vol. 37, No. 4, 2009, pp. 7346-7354.
International Search Report and Written Opinion for International Patent Application No. PCT/US2020/018148 dated Jul. 7, 2020, pp. 1-7.
Office Communication for U.S. Appl. No. 16/231,842 dated Sep. 25, 2020, pp. 1-15.
Office Communication for U.S. Appl. No. 16/231,842 dated Jan. 8, 2021, pp. 1-7.
Office Communication for U.S. Appl. No. 16/940,233 dated Feb. 26, 2021, pp. 1-18.
Office Communication for U.S. Appl. No. 16/940,233 dated May 7, 2021, pp. 1-5.
Office Communication for U.S. Appl. No. 16/940,233 dated Jun. 25, 2021, pp. 1-11.
Tsai, Ming-Feng et al., "On the risk prediction and analysis of soft information in finance reports," European Journal of Operational Research, 2017, vol. 257, pp. 243-250.

* cited by examiner

US 11,361,034 B1

REPRESENTING DOCUMENTS USING DOCUMENT KEYS

TECHNICAL FIELD

The present invention relates generally to document management, and more particularly, but not exclusively, to analyzing document content.

BACKGROUND

Documents, including legal contracts, are becoming increasingly complex, varied and unstructured. It takes a skilled human to understand and analyze documents to break them into their constituent clauses and sections. Analyzing a document manually is a time consuming and error prone process. The accuracy of the results is also heavily dependent on the experience and training of the person performing the process. Also, automated analysis, comparison, or categorization of complex documents may be disadvantaged by a lack of generally applicable metrics or standards that may be suitable for generalized analysis, comparison, or categorization of complex documents. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
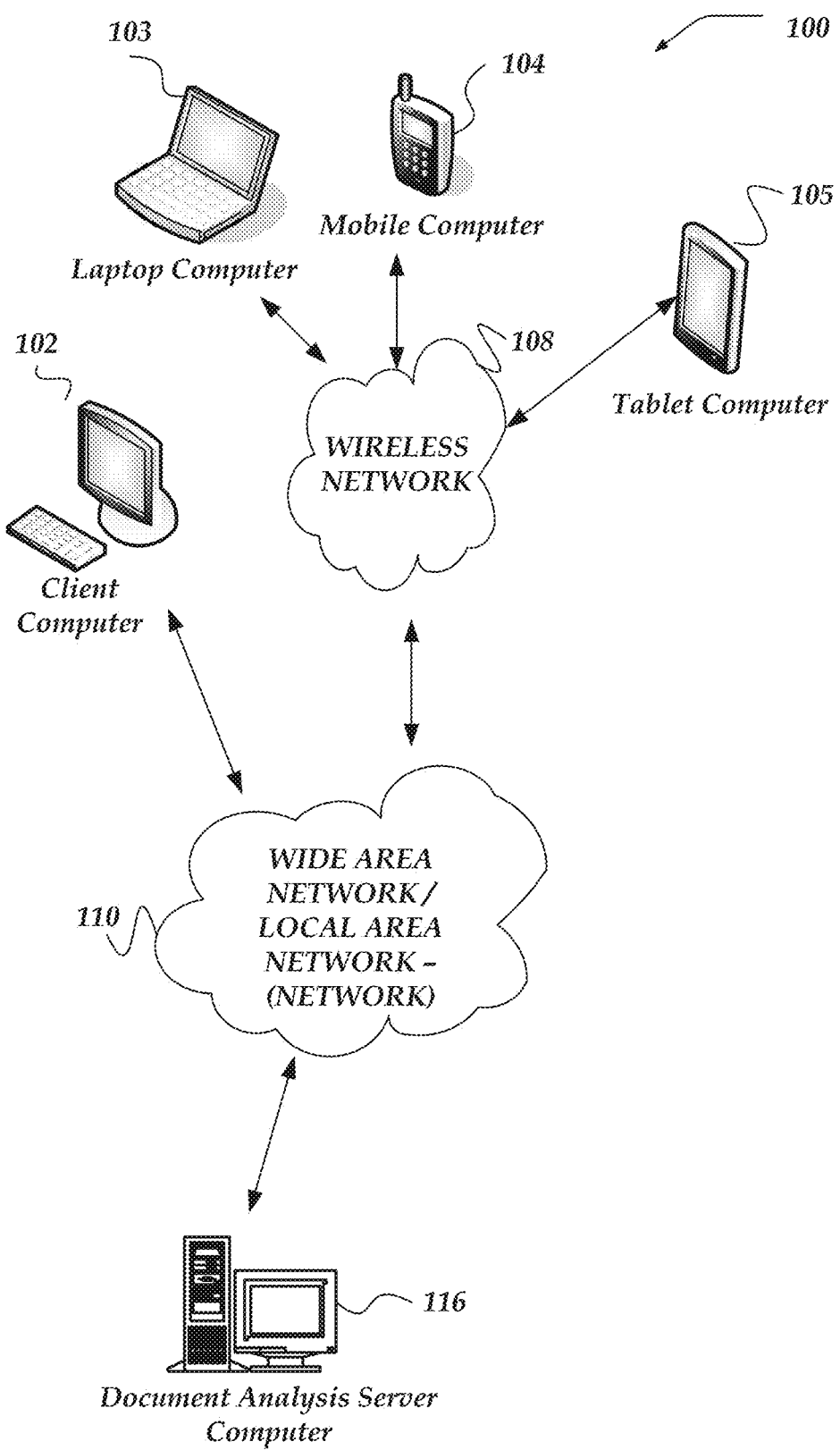
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term, "clause classification models" refers to a package or bundle of computer readable instructions, configuration information, rules, patterns, regular expressions, condition logic, machine-learning classifiers, heuristics, software libraries, or the like, or combination thereof that may be used to classify the clauses that may be in documents into clause categories.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to representing documents using document keys. In one or more of the various embodiments, one or more documents that include one or more clauses may be provided.

In one or more of the various embodiments, each clause type for the one or more clauses in the one or more documents may be determined based on one or more classification models.

In one or more of the various embodiments, one or more clause identifiers may be associated with the one or more clauses based on one or more clause types of each clause.

In one or more of the various embodiments, a document key may be generated for each document based on an ordered collection of the one or more clauses included in each document such that each clause identifier may be positioned in the document key based on an order of its location in a corresponding clause of a document.

In one or more of the various embodiments, the one or more documents may be analyzed based on one or more comparisons of one or more document keys corresponding to the one or more documents.

In one or more of the various embodiments, one or more reports may be generated based on one or more results of the analysis.

In one or more of the various embodiments, generating the document key for each document may include: determining one or more clause identifier groups based on a portion of the one or more clause identifiers that are contiguously positioned in the document key; and. classifying the one or more documents based on the one or more clause identifier groups included in the one or more document keys.

In one or more of the various embodiments, associating the one or more clause identifiers with the one or more clauses may include: determining one or more features of the one or more documents such that the one or more characteristics may include one or more of format, style, font, structural information, layout information, document meta-data, tables, figures, or the like; and, in some embodiments, providing one or more other clause identifiers that may correspond to the one or more characteristics such that the one or more other clause identifiers may be included in the one or more document keys.

In one or more of the various embodiments, analyzing the one or more documents may include: generating one or more vectors based on the one or more document keys such that each element of the one or more vectors may corresponds to a clause identifier and such that each element of the one or more vectors may be a real number; determining one or more distance values between one or more pairs of the one or more vectors; and determining a similarity score for the one or more documents based the one or more distance values.

In one or more of the various embodiments, analyzing the one or more documents may include: determining one or more changes to the one or more document keys that may occur at different times during a lifetime of the one or more documents; and determining one or more changes to the one or more document that may occur at different times during the lifetime of the document based on the one or more changes to the one or more document keys.

In one or more of the various embodiments, generating the document key for each document may include: determining one or more portions of the one or more documents such that each portion may be one or more of a section of the one or more documents, a chapter of the one or more documents, a page of the one or more documents, or the like; and generating another document key for each portion of the one or more documents that include one or more other clause identifiers that may correspond to one or more other clauses in the one or more portions of the one or more documents.

In one or more of the various embodiments, determining each clause type for the one or more clauses in the one or more documents may include: determining one or more of a rule, an instruction, a heuristic, a trained machine-learning classifier, a regular expression, or the like, based on the one or more classification models; employing the one or more of the rule, the instruction, the heuristic, the trained machine-learning classifier, the regular expression, or the like, to determine each clause type of the one or more clauses in the one or more documents; and mapping each clause type of the one or more clauses to the one or more clause identifiers.

In one or more of the various embodiments, generating one or more other document keys for the one or more documents such that the one or more other document keys include one or more other clause identifiers that correspond to one or more other characteristics of the one or more clauses that are different than one or more characteristics that correspond to the one or more clause identifiers.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, document analysis server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, document analysis server computer 116, or other computers.

Client computers 102-105 may further be configured to include a client application that enables an end-user to log into an end-user account that may be managed by another computer, such as document analysis server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by document analysis server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, document analysis server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of document analysis server computer 116 is described in more detail below in conjunction with FIG. 3. Although FIG. 1 illustrates document analysis server computer 116 as a single computer, the innovations or embodiments are not so limited. For example, one or more functions of document analysis server computer 116, or the like, may be distributed across one or more distinct network computers. Moreover, in one or more embodiments, document analysis server computer 116 may be implemented using a plurality of network computers. Further, in one or more of the various embodiments, document analysis server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
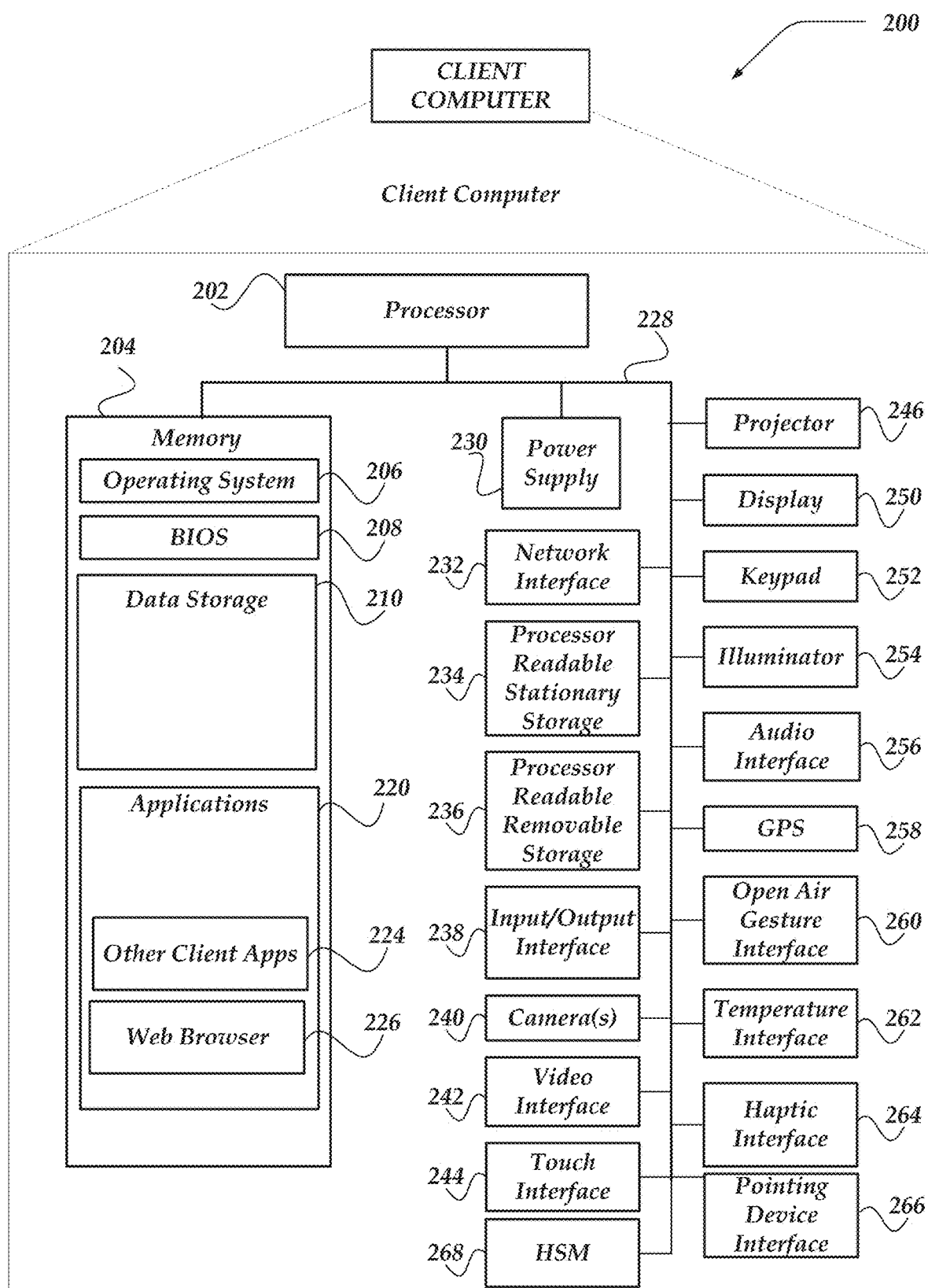
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in documents, clauses, evaluators, machine learning models, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version UNIX, or Linux®, or a specialized client computer communication operating system such as Windows Phone™, or the Apple Corporation's iOS or macOS® operating systems. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, document management operations, document administration, document evaluation, document clause discovery, queries, searches, messages, notification messages, event messages, alerts, performance metrics, log data, API calls, or the like, combination thereof, with document analysis server computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
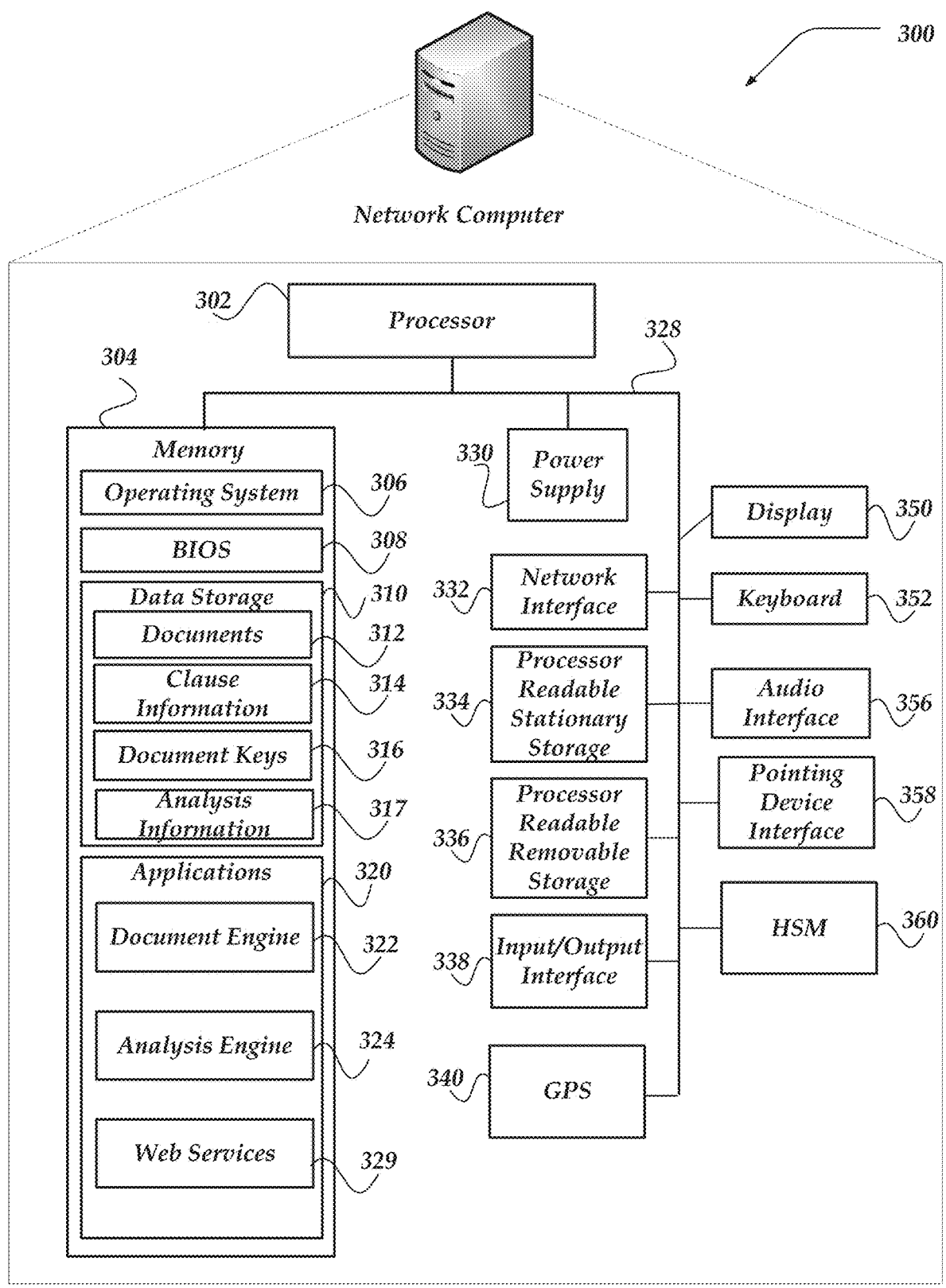
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least document analysis server computer 116 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, document engine 322, validation engine 324, machine learning engine 326, web services 329, or the like, may be arranged to employ geo-location information to select one or more localization features, such as, time zones, languages, currencies, currency formatting, calendar formatting, or the like. Localization features may be used in documents, clauses, clause meta-data, file systems, user-interfaces, reports, textual evaluators, semantic evaluators, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, documents 312, clause information 314, document keys 316, analysis information 317, or the like. Documents 314 may store files, documents, versions, properties, meta-data, data structures, or the like, that represent one or more portions of a document, including raw documents or documents that have underdone clause discovery. Clause information 314 may store one or more clauses that have previously been evaluated or validated as well as clause types, clause identifiers indexes, clause classification models, or the like. Document keys 316 may store one or more document keys or clause identifiers corresponding to one or more documents or document types. And, analysis information 317 may store information related to performing document analysis, including, instructions for various document/document key analysis operations, report/result information, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include document engine 322, analysis engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, document engine 322, analysis engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to document engine 322, analysis engine 324, web services 329, or the like, may be provisioned and de-commissioned automatically.

Also, in one or more of the various embodiments, document engine 322, analysis engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
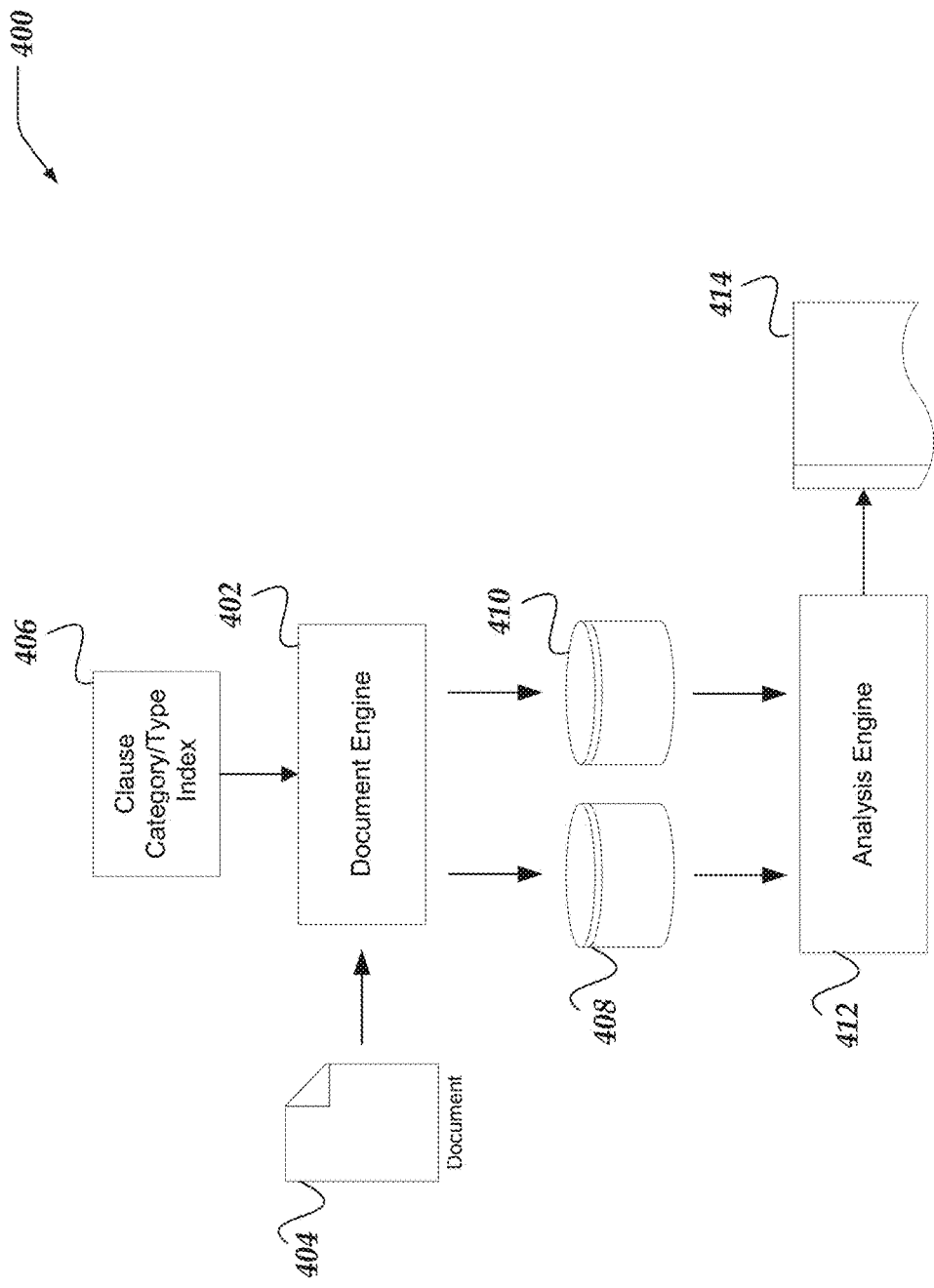
FIG. 4 illustrates a function schematic of a system for representing documents using document keys in accordance with one or more of the various embodiments.

FIG. 4 illustrates a function schematic of system 400 for representing documents using document keys in accordance with one or more of the various embodiments. In one or more of the various embodiments, documents, such as document 402 may be provided to a document analysis server, such as, document analysis server computer 116. In some embodiments, document 402 may be provided from a database or document management server. In some embodiments, a client computer, such as, client computer 200 may be arranged to provide one or more documents to a document analysis server that comprises various processing engines, such as, document engine 322, analysis engine 324, or the like. In one or more of the various embodiments, some or all of the functions in system 400 may be performed by one or more document engines or one or more analysis engines that may be running on one or more network computers.

In one or more of the various embodiments, document engines may be arranged to identify candidate clauses that may be in a document. In some embodiments, a document engine may employ one or more machine learning models to classify or categorize the one or more clauses included in document 404.

In one or more of the various embodiments, document engine 402 may be arranged to associate a clause identifier to each clause in document 404. In one or more of the various embodiments, document engines may be arranged to employ one or more clause classifier models that may employ one or more machine-learning models, heuristics, rules, or the like, or combination thereof for determining a category or type for each clause. Accordingly, in some embodiments, a clause identifier that corresponds to the determined clause type may be associated with each clause in a given document.

In one or more of the various embodiments, document engines may be arranged to generate a document key that may be comprised of the one or more clause identifiers that were determined for its included clauses. In some embodiments, the document key may be an ordered collection (e.g., array, list, vector, or the like) of clause identifiers where the order of the clause identifiers in the document key corresponds to the order the corresponding clauses occur in the original document.

Accordingly, in some embodiments, document engines may be arranged to store documents, such as, document 404 in a document repository, such as document repository 408. Likewise, in some embodiments, document engines may be arranged to store the generated document keys in a document key repository, such as, document key repository 410. In some cases, repository 408 or repository 410 may be the same repository. For example, in some embodiments, document engines may be arranged to include or associate document keys as meta-data for documents stored in a document repository. Or, alternatively, in some embodiments, documents and document keys may be stored separately in the same repository.

In one or more of the various embodiments, analysis engines, such as, analysis engine 412 may be arranged to execute various data analysis or data mining based on document or document keys. In some embodiments, analysis engines may be arranged to employ machine-learning, heuristics, time series analysis, or the like, or combination thereof to perform various analysis of documents. In some embodiments, analysis engines may be arranged to employ document keys to perform some analysis of the documents. In some embodiments, it may be advantageous to perform document analysis based on document keys because document keys may have a much smaller footprint than the corresponding source documents. Likewise, in some embodiments, documents may be compared based on the order of clauses, occurrence or location of clause types, or the like, even if the text of individual clauses may vary. For example, two documents may have 'contract preamble' clauses that may be comprised of different text even though they provide the same function or represent the same clause category in each respective document. Accordingly, in some embodiments, analysis engines may be arranged to employ document keys or clause identifiers to enable analysis related to the occurrence, location/position, frequency, or the like, of given clause types without processing, parsing, or evaluating the specific words or phrases that comprise the documents or clauses of interest.

In one or more of the various embodiments, analysis engines may be arranged to perform various analysis using the document keys. In some embodiments, one of ordinary skill in the art will appreciate that numerous or varied analysis may be performed using document keys. In some embodiments, analysis engines may be arranged to include one or more built-in analytical processes. However, in some embodiments, analysis engines may be arranged to employ one or more analytical processes imported or declared in configuration information to account for local requirement or local circumstances. Also, in some embodiments, analysis engines may be arranged to export document keys to other analytical platforms that may perform document analysis using the document keys.

In some embodiments, analysis engine 412 may be arranged to generate one or more reports, such as, report 414 that may include one or more metrics generated from analyzing document keys. In some embodiments, report 414 may be considered to represent various types of reports, including interactive dashboards, conventional hard-copy report documents, data files, log files, interactive reports, or the like. In some embodiments, report 414 may include generating one or more events or notifications based on the results of a given analysis. Accordingly, in one or more of the various embodiments, analysis engines may be arranged to employ templates, rules, instructions, or the like, provided via configuration information to determine the contents, appearance, formatting, action, or the like, for a given report.

In one or more of the various embodiments, document analysis platforms may be arranged to support various types of documents, such as, contracts, deeds, license agreements, patents, or other types of documents. Accordingly, in some embodiments, document engines may be arranged to employ one or more clause classification models that may be directed (trained) for different types of documents or different kinds of subject matter. In some embodiments, document analysis platforms may be enabled to train or otherwise develop custom clause classification models based on local requirements or local circumstances.

Further, in some embodiments, document engines may be arranged to identify one or more structural features or meta-data information that may be mapped (or encoded) using clause identifiers rather than being strictly limited to associating clause identifiers with clauses from a source document. For example, one or more clause identifiers may be employed to indicate page-breaks, chapter breaks, section breaks, or the like. Likewise, in some embodiments, clause identifiers may be employed represent fonts, formatting, styling, structural information, layout information, meta-data, table, figures, or the like, that may be included in source documents. Accordingly, in some embodiments, document keys may include one or more clause identifiers that correspond to actual text clauses as well as one or more clause identifiers that correspond to structural features or fonts, formatting, styling, structural information, layout information, meta-data, table, figures, or the like. Further, in some cases, document keys may be generated for different portions of a document. For example, document engines may be arranged to generate document keys for each chapter or section of a document. In some embodiments, document engines may be arranged to provide different document keys for different hierarchical scope in the same document. For example, for some embodiments, a document key may be generated such that a single clause identifier corresponds to a section or chapter. Thus, in this example, individual chapters or sections may be classified and associated with a clause identifier while each individual chapter or section may be associated with their own document key where the clause identifiers represent clauses in the section or chapter of the larger document.

Also, in some embodiments, document engines may be arranged to generate document keys that may be extended to support higher dimensions rather being limited to a one-dimensional representation. In some embodiments, multi-dimensional document keys may be provided by employing multiple document keys for the same document where the different document keys may be directed to different types of clause identifiers. For example, a first document key may be based on classifying the type of clauses while a second document key for the same document may be based on other structural or semantic features of interest.

In one or more of the various embodiments, analysis engines may be arranged to employ document keys with machine-learning/Neural/deep learning based Natural Language Processing (NLP) algorithms. In some embodiments, analysis engines may be arranged to vectorize document keys to map them into a Real (number) vector space. Thus, in some embodiments, conventional data/numerical approaches may be applied to the vectorized document keys to perform analysis using conventional techniques, including, document classification, clustering, similarity, or the like. For example, in some embodiments, analysis engines may be arranged to determine the similarity between two or more documents based on distance computations based on their respective vectorized document keys. In some embodiments, analysis engines may be arranged to employ one or more vectorization methods, such as, Bag-of-Words (BoW), Term Frequency-Inverse Document Frequency (Tf-Idf), or the like, to convert document keys comprised of clause identifiers in vectors suitable for other analysis techniques.

Figure 5:
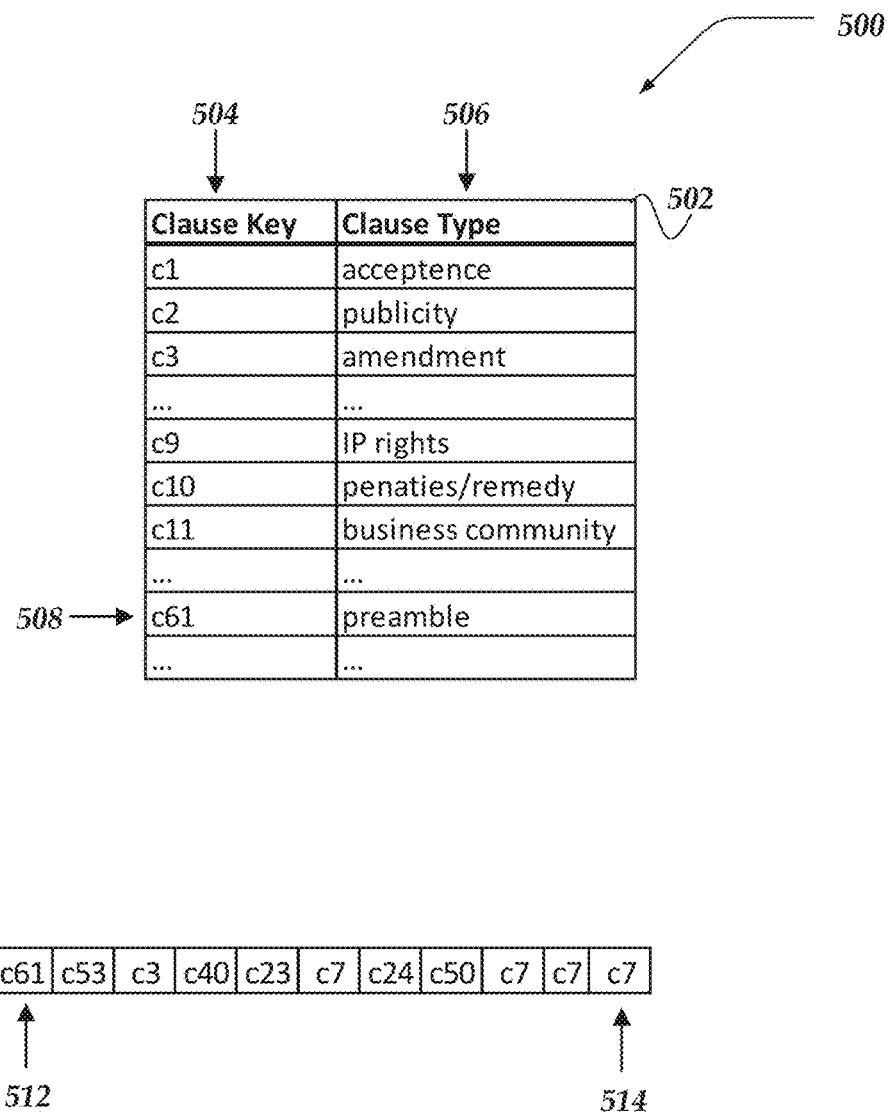
FIG. 5 illustrates a portion of a logical schematic of a system for representing documents using document keys in accordance with one or more of the various embodiments.

FIG. 5 illustrates a portion of a logical schematic of system 500 for representing documents using document keys in accordance with one or more of the various embodiments. In one or more of the various embodiments, document analysis platforms may be arranged to generate one or more data structures for representing documents using document keys.

In one or more of the various embodiments, document engines may be provided a clause identifier map, such as, clause identifier map 502 that may be arranged to map clause identifiers to clause types. In this example, table 502 represents a clause identifier map where column 504 represents a column for storing clause identifiers and column 506 represents a column holding the label/description for different clause categories. Accordingly, in this example, row 508 represents clause identifier 'c61' that corresponds to a contract preamble clause.

Further, in some embodiments, document engines may be arranged to generate document keys, such as, document key 510. In some embodiments, document keys may be comprised of the clause identifiers for a document. Clause identifiers in document keys may be ordered to match the order that the corresponding clauses occur in the source documents. In this example, for some embodiments, clause identifier 512 in document key 510 represents that the first clause in the source document (not shown) is a preamble clause. Similarly, in this example, represents that the last clause in the source document has the clause identifier c7.

Note, in some embodiments, document keys may be considered generally analogous to biologic genomes, clause identifiers may be considered generally analogous to biologic genes, or contiguous groups of clause identifiers in the same document key that may match particular patterns of clause identifiers may be considered generally analogous to chromosomes.

As described above, for brevity and clarity clause identifiers are described as corresponding to clauses in a document. However, one of ordinary skill in the art will appreciate that they are not so limited. In some embodiments, clause identifiers may be defined for various structural features, stylistic features, semantic features, or the like, of documents. Also, in some embodiments, document engines may be enabled to generate more than one document key for a given document where each document key may be associated with a different class of features or metrics. In some cases, these multiple feature dimensions may be represented using multi-dimensional document keys rather than multiple one-dimensional document keys.

Figure 6:
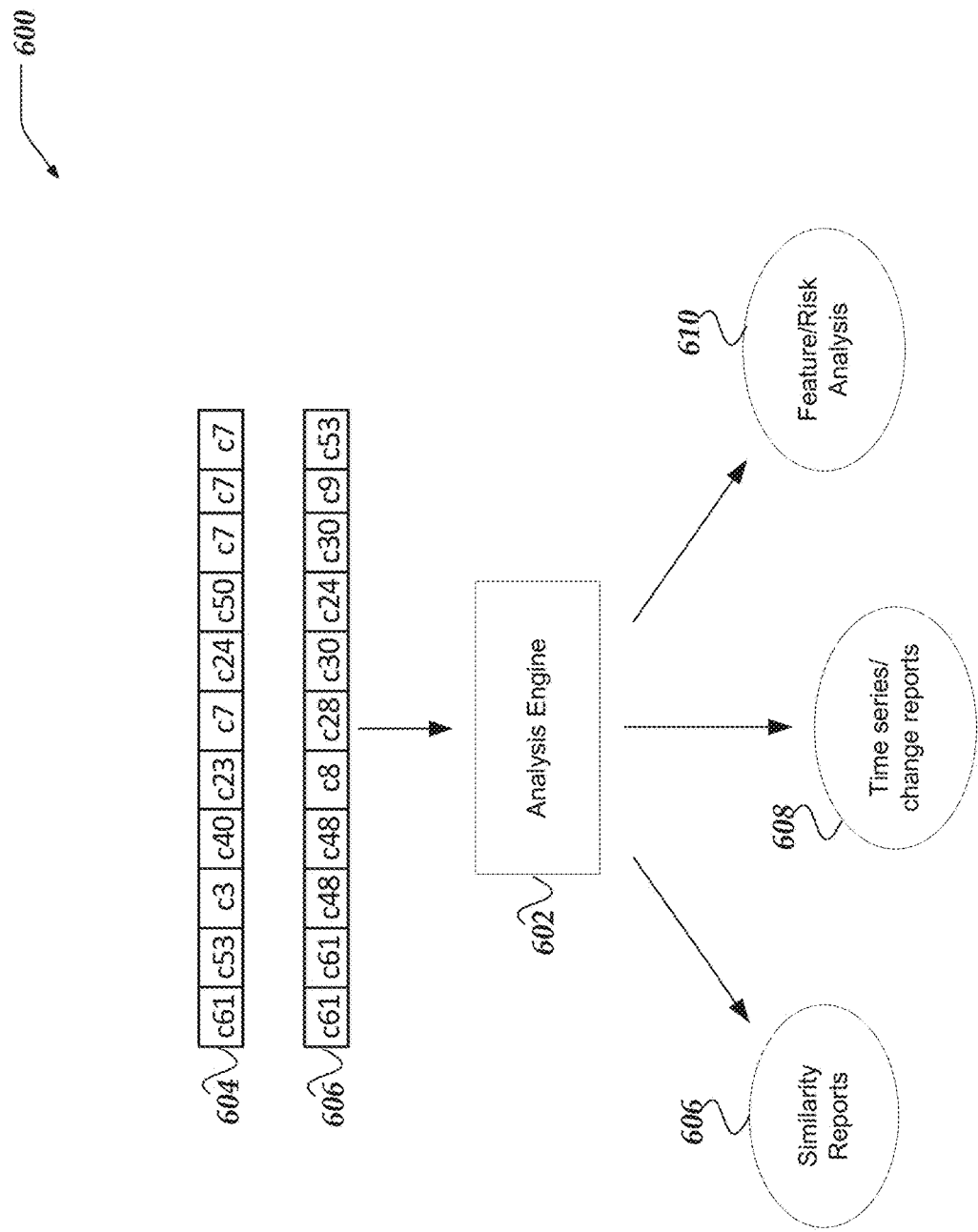
FIG. 6 illustrates a portion of a logical schematic of a system for representing documents using document keys in accordance with one or more of the various embodiments.

FIG. 6 illustrates a portion of a logical schematic of system 600 for representing documents using document keys in accordance with one or more of the various embodiments. In some embodiments, document analysis platforms may be arranged to employ document keys to perform various analysis of documents.

Accordingly, in one or more of the various embodiments, analysis engines, such as, analysis engine 602 may be arranged to perform various actions to analyze one or more documents based on their corresponding document keys. In this example, document key 604 and document key 606 may represent document keys for one or more documents. As described above, in some embodiments, document engines may be arranged to classify clauses in documents to map them to clause identifiers that may be collected into document keys for each document. Accordingly, in this example, document key 604 and document key 606 may represent document keys for two different documents.

In one or more of the various embodiments, analysis engines may provide one or more user-interfaces, APIs, or the like, that enable users or select one or more documents or document keys for analysis. In this example, document key 604 and document key 606 may be provided to analysis engine 602 for analysis. In some embodiments, the particular analysis may vary depending on user preference as well as how the analysis engine may be configured. In some embodiments, analysis engines may offer one or more analysis options, including one or more built-in options or one or more customized analysis options. For example, in some embodiments, analysis engines may be arranged to enable one or more plugins, scripts, rules, libraries, or the like, that provide instructions for performing various types of analysis. Accordingly, in some embodiments, analysis engines may be arranged to enable one or more plugins, scripts, rules, libraries, or the like to be determined from configuration information to account for local requirements or local circumstances.

In some embodiments, analysis engines may be arranged to provide one or more ways to define or identify skeletal structures of documents. Accordingly, in some embodiments, document keys may provide an ordered list of arbitrary symbols compiled into ordered lists/vectors which represent a given type of document (or clause in a given document). In some embodiments, clause types or document types may be different or relevant depending on the domain or sphere of activity associated with a given document. Accordingly, in some embodiments, clauses may be classified differently depending on the subject matter domain being considered. Thus, in some embodiments, the same document may have different document keys depending on the domain or perspective being considered. For example, document keys determined for a real estate contract may be different in different contexts. For example, if the real estate contract is being analyzed for its legal effect, the corresponding document key may be different than if the same real estate contract is being analyzed for its complexity or readability. For example, a clause that is classified as a contract preamble in one analysis perspective may be classified as an 'introduction' under another analysis perspective.

Also, in some embodiments, analysis engines may be arranged to employ document keys to compare instances of a document type based on the document keys such that deviations and anomalies maybe be discovered. Also, in some embodiments, analysis engines may be arranged to track changes that may occur in a document.

In some embodiments, analysis engines may be arranged to employ document keys to cluster the instances of documents into types and for various document management goals or initiatives.

In some embodiments, analysis engines may be arranged to employ document keys to provide one or more ways to describe an individual document belonging to a type based on the characteristics of its document keys or clause identifiers.

In some embodiments, analysis engines may be arranged to employ document keys to define additional levels of grouping of contiguous substrings (e.g., clause identifier groups) of the clause identifier symbols that may be considered analogous to 'genes' in biological genetic material such as sets of clause identifiers that co-occur commonly in certain specific patterns. Further, in some embodiments, analysis engines may be arranged to enable different small variations of the clause identifiers and in documents to be treated as variations in expression of a specific type of clause identifier groupings. Further, in some embodiments, documents may be classified based on the occurrence of one or more clause identifier groups in their corresponding document key.

In some embodiments, analysis engines may be arranged to employ document keys to provide a generalized representation of document types with the clause identifiers augmented with decorators for form/layout constraints, orientation and additional information that may be related or relevant to various documents or document types when displaying or generating document instances based on one or more defined document keys or clause identifiers.

In one or more of the various embodiments, analysis engines may be arranged to generate one or more metrics based on document keys or clause identifiers. For example, in some embodiments, analysis engines may be arranged to generate a complexity metric for contracts or other types of documents in terms of the word length, word composition/selection, or the like, of the clauses that make up the documents. Thus, in some embodiments, analysis engines may be arranged to associate or include various metrics with clause identifiers to compute overall metrics for a given document. Note, in some cases, the desirability or utility of specific metrics may vary depending on the type of documents, type of analysis, subject matter domain, or the like. Accordingly, in some embodiments, analysis engines may be arranged to employ rules, instructions, or the like, provided via configuration information to determine the specific information that may be included or associated with various clause identifiers.

In some embodiments, analysis engines may be arranged to determine distributions of document types (or documents having particular features of interest) in a document repository based on their corresponding document keys.

In some embodiments, analysis engines may be arranged to determine that documents that appear to be different to a user/reader may be determined to be considered similar or the same based on a comparison of the corresponding document keys. In some embodiments, analysis engines may be arranged to classify one or more clauses comprised of different words or words arrangements as having the same clause identifier. Thus, in some cases, documents that may conventionally appear to be different may be determined be similar based on having similar clause identifiers or clause identifier groups.

In some embodiments, analysis engines may be arranged to evaluate the temporal evolution of a given document type or document by evaluating changes to document keys that may occur overtime. In some embodiments, analysis engines may determine how or when documents have changed based on observing incremental changes to the corresponding document keys.

Further, in some embodiments, analysis engines may be arranged to determine if documents include required or restricted clauses based on their document keys. Likewise, in some embodiments, analysis engines may be arranged to employ risk or compliance models that may determine risk metrics or compliance based on document keys rather than attempting to evaluate the whole raw document.

In some embodiments, analysis engines may be arranged to employ one or more dynamic evolutionary models, or the like, to evaluate/observe the evolution of contract documents during negotiation through execution.

In one or more of the various embodiments, analysis engines may be arranged to generate one or more reports that include one or more metrics, results, or the like, generated from the analysis. Accordingly, in this example, results 606, results 608, results 610 may represent results or reports generated by various analytical analysis that may be supported by an analysis engine. In some embodiments, document engines may be arranged to provide document keys to other services, including third-party or external services, to enable such services to perform analysis of the document keys to gain insights into the source documents.

As described above, in some embodiments, analysis engine 602 may be arranged to generate one or more reports that may include one or more metrics generated from analyzing document keys. In some embodiments, reports may be considered to represent various types of reports, including interactive dashboards, conventional hard-copy report documents, data files, log files, interactive reports, or the like. In some embodiments, reports may include generating one or more events or notifications based on the results of a given analysis. Accordingly, in one or more of the various embodiments, analysis engines may be arranged to employ templates, rules, instructions, or the like, provided via configuration information to determine the contents, appearance, formatting, action, or the like, for a given report.

Generalized Operations

Figure 7:
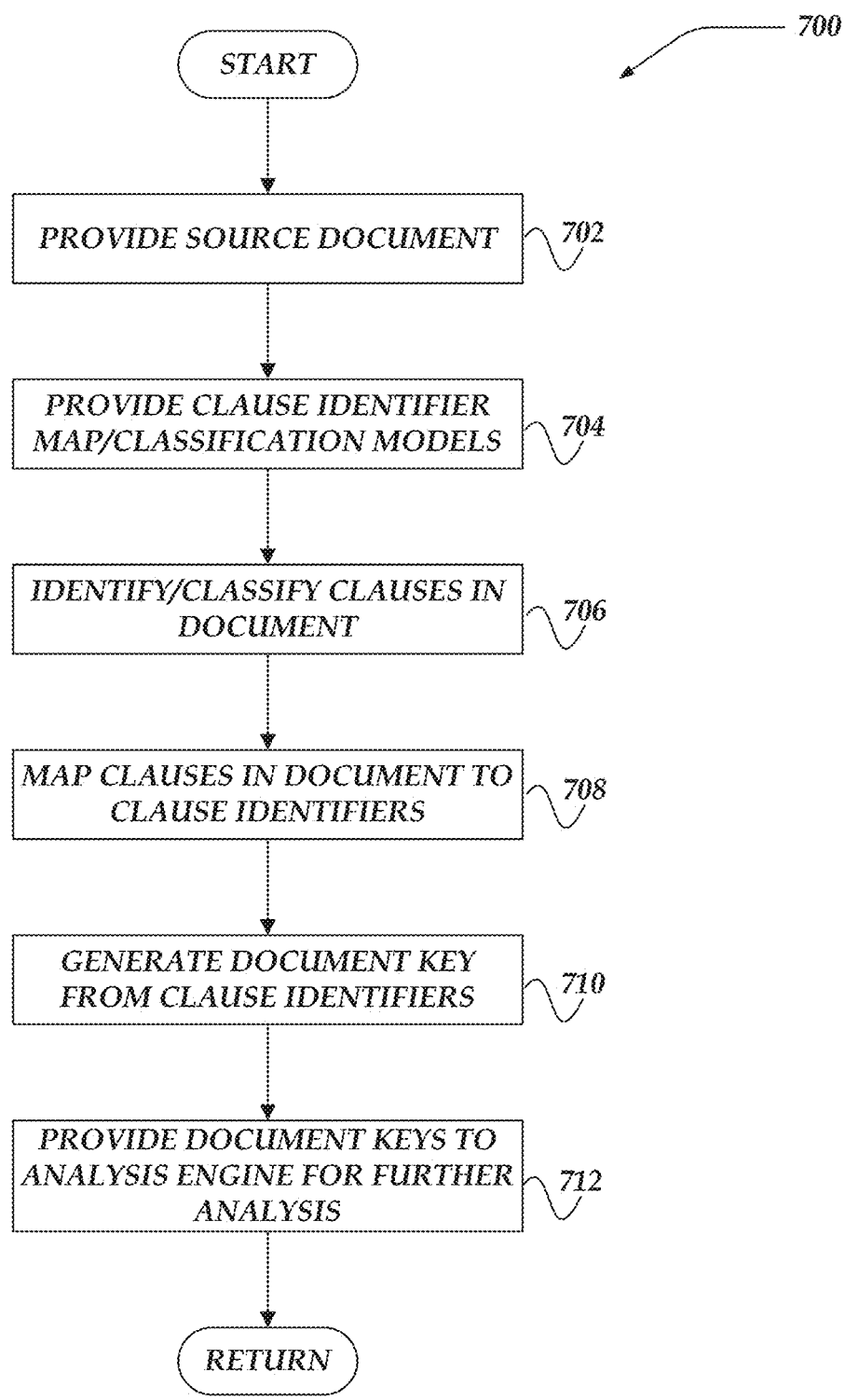
FIG. 7 illustrates an overview flowchart of a process for representing documents using document keys in accordance with one or more of the various embodiments.
Figure 8:
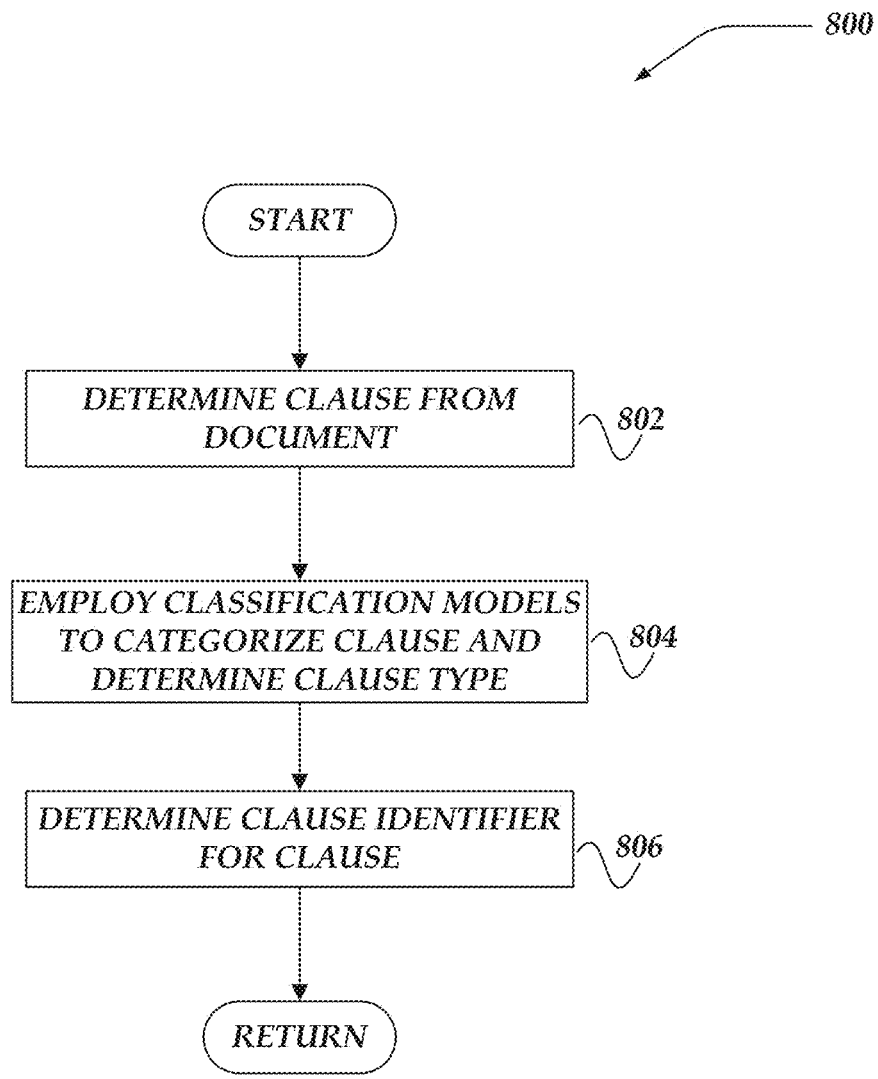
FIG. 8 illustrates a flowchart of a process for representing documents using document keys in accordance with one or more of the various embodiments.
Figure 9:
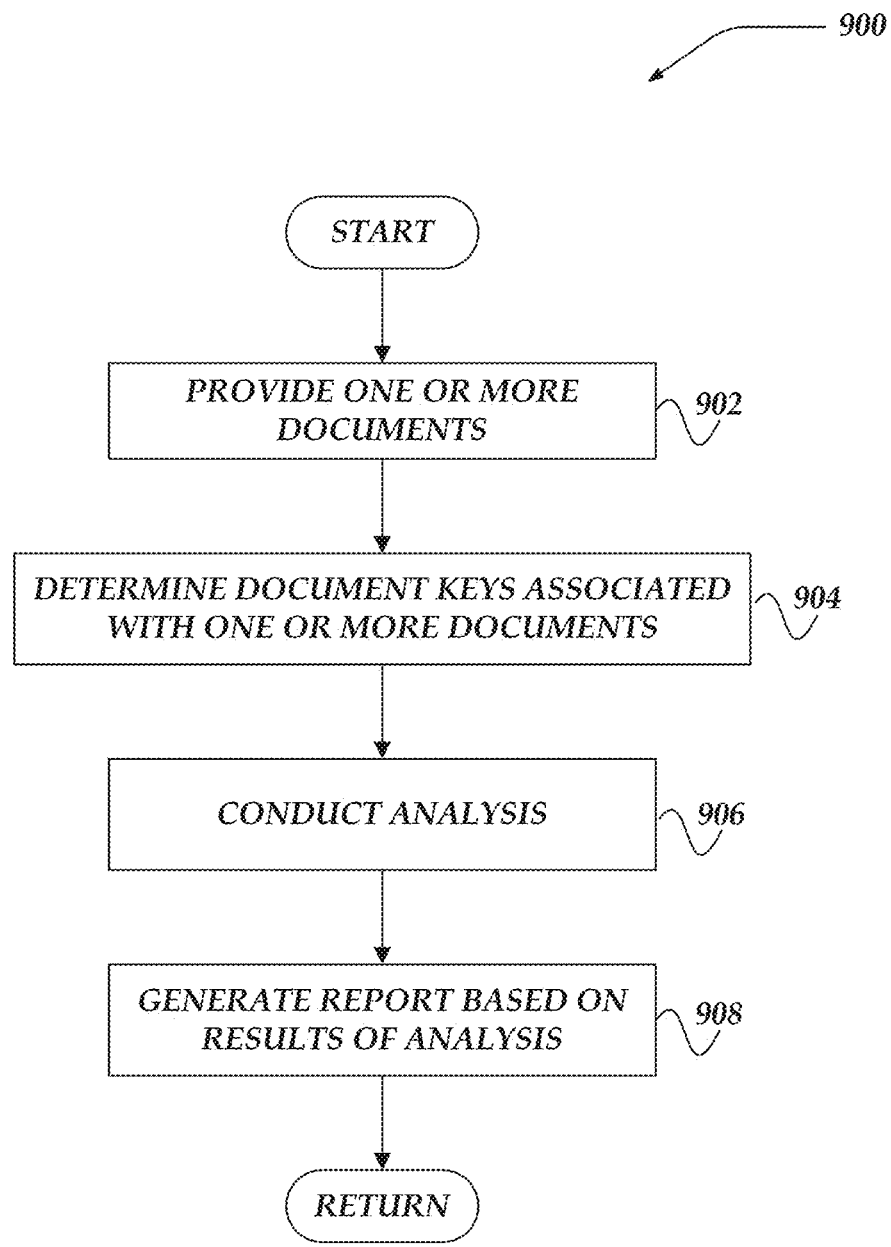
FIG. 9 illustrates a flowchart of a process for representing documents using document keys in accordance with one or more of the various embodiments.

FIGS. 7-9 represent generalized operations for representing documents using document keys in accordance with one or more of the various embodiments. In one or more of the various embodiments, processes 700, 800, and 900 described in conjunction with FIGS. 7-9 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-9 may be used for representing documents using document keys in accordance with at least one of the various embodiments or architectures such as those described in conjunction with FIGS. 4-6. Further, in one or more of the various embodiments, some or all of the actions performed by processes 700, 800, and 900 may be executed in part by document engine 322, or analysis engine 324 running on one or more processors of one or more network computers.

FIG. 7 illustrates an overview flowchart of process 700 for representing documents using document keys in accordance with one or more of the various embodiments. After a start block, at block 702, in one or more of the various embodiments, one or more source documents may be provided to a document analysis platform.

In one or more of the various embodiments, source documents may be collected automatically from a document data store or other document provider. For example, in some embodiments, as documents are received or generated by an organization may be automatically provided to a document analysis platform. In other cases, for some embodiments, users may be enabled to selectively determine the source documents that may be provided to the document analysis platform. In some embodiments, document engines or analysis engines may be configured to employs one or more rules or filters for automatically selecting source documents from a larger collection of documents.

At block 704, in one or more of the various embodiments, one or more clause identifier maps and one or more classification models may be provided to the document analysis platform. As described above, clause identifiers may be associated with particular clause types. Accordingly, in some embodiments, one or more lists, maps, dictionaries, indexes, or the like, that explicitly map symbols representing clause identifiers to clause types may be provided.

In some embodiments, document engines may be arranged to support different types of documents such as, contracts, deeds, licenses, or the like. Likewise, in some embodiments, analysis engines may be arranged to support documents from different or varied subject matter domains. Accordingly, in some embodiments, document engines may be arranged to support multiple clause identifier maps that may be directed towards different types of documents or different kinds of subject matter.

At block 706, in one or more of the various embodiments, document engines may be arranged to identify or classify the clauses included in the source documents. In some embodiments, document engines may be arranged to employ one or more clause classification models to determine the type of clauses included in the documents.

At block 708, in one or more of the various embodiments, document engines may be arranged to map clauses in the document to one or more clause identifiers. In one or more of the various embodiments, document engines may be arranged to employ the one or more provided clause identifier maps to determine clause identifiers for each clause based on the type of the clauses. Note, in some embodiments, one or more clauses or clause types may be filtered or excluded from further processing. Accordingly, in some embodiments, document engines may be arranged to apply one or more filters or rules that may exclude one or more clauses or clause types from further consideration. In some embodiments, these filters or rules may be determined based on configuration information. For example, in some embodiments, document engines may be arranged to provide a user interface that enables users to indicate if one or more clause types should be disregarded.

At block 710, in one or more of the various embodiments, document engines may be arranged to generate document keys for the documents from the clause identifiers.

In one or more of the various embodiments, document engines may be arranged to combine the one or more clause identifiers for each document into document keys. In one or more of the various embodiments, document engines may be arranged to employ one or more data structures, such as, lists, arrays, vectors, or the like, that enable clause identifiers associated with a document to combined into document keys. In some embodiments, document keys may be arranged to order the included clause identifiers based on where the corresponding clauses occur in the documents. For example, if the first clause of a document maps to clause identifier c45 and the second clause of the document maps to clause identifier c19, c45 will be the first clause identifier in the document key for the document and c19 will be the second clause identifier in the document key for the document.

At block 712, in one or more of the various embodiments, document engines may be arranged to provide the one or more document keys to an analysis engine for further analysis.

In one or more of the various embodiments, analysis engines may be arranged to enable various types of analysis that may be based on document keys or clause identifiers, such as, clustering, similarity, anomaly detection, document classification, or the like. Accordingly, in some embodiments, analysis engines may be arranged to perform one or more selected analysis operations on the provided documents based on their corresponding document keys or clause identifiers.

In one or more of the various embodiments, analysis engines may be arranged to produce one or more static or interactive reports to display the results of the analysis.

Further, in some embodiments, document engines may be arranged to provide or otherwise make available document keys or clause identifier to other services that may perform their own analysis using the document keys or clause identifiers.

Next, in one or more of the various embodiments, control may be returned to a calling process.

FIG. 8 illustrates a flowchart of process 800 for representing documents using document keys in accordance with one or more of the various embodiments. After a start block, at block 802, in one or more of the various embodiments, clauses from documents may be determined by document engines. Accordingly, in some embodiments, clauses from the provided documents may be determined. Note, in some embodiments, rules, parsers, grammars, pattern matching, regular expressions, filters, or the like, employed to determine individual clauses in a document may vary depending local circumstance or local requirements. Accordingly, one of ordinary skill in the art will appreciate that document engines may employ rules, parsers, grammars, pattern matching, regular expressions, filters, or the like, provided via configuration information to determine individual clauses in the documents. For example, if a document is provided to a document engine using a structured representation such as XML, document engines may employ parsers that process the XML based on its Document Type Definition (DTD) if one may be available. In other cases, document engines may be arranged to provide user interfaces that enable users to create rules, regular expressions, or the like, that may be employed to identify clauses in the documents of interest. Similarly, in some embodiments, document engines may be configured to parse/process other conventional formats or custom formats.

At block 804, in one or more of the various embodiments, document engines may be arranged to employ classification models to categorize the clauses from the documents.

In some embodiments, document engines may be arranged to include or be provided clause classification models for classifying various clauses that may be in a document. In some embodiments, the selection or availability of clause classification models may vary depending on the type of documents being processed. For example, document engines may employ one or more different classification models for legal documents or one or more different classification models for medical documents. Accordingly, in some embodiments, as different types of documents may be introduced to a document management platform, additional/different clause classification models may be built into document engines or provided via configuration information.

Also, in some embodiments, different clause classification models may be configured to classify the same clause differently. Thus, in some embodiments, document engines may be enabled to classify clauses differently depending various factors, including, document type, subject matter domain, purpose of the analysis, or the like. For example, clauses of a legal document may be classified differently depending on the purpose or goal of the analysis. Thus, in some cases, if a document is being analyzed to determine if conforms to one or more legal/technical requirements of a contract, its clauses may be classified into clause types associated with legal contracts rather than clause types otherwise associated with other subject domains, such as, screen plays, literature, marketing materials, or the like.

In one or more of the various embodiments, clause classification models may be comprised of various rules, instructions, heuristics, trained machine-learning classifiers, pattern matching, or the like, or combination thereof. For example, in some embodiments, a clause classification model may be configured to perform one or more steps such as executing a filter before submitting a clause to one or more machine-learning classifiers, followed by a heuristic to provide sanity checking, or the like. Likewise, in some embodiments, classification models may be compound models comprised of one or more sub-models.

In some embodiments, classification models may provide confidence scores, or the like, that may indicate a quality of the classification in view of a specific classification model.

At block 806, in one or more of the various embodiments, document engines may be arranged to determine clause identifiers for the categorized clauses. In one or more of the various embodiments, clause identifiers may be comprised of one or more symbols that correspond to clause types. Accordingly, in some embodiments, document engines may be arranged to map clause types to clause identifiers. In some cases, two or more clause types may map to the same clause identifier depending on various factors, including, subject matter of the document, document type, analysis type, or the like. Alternatively, in some embodiments, individual clause types may correspond directly to individual clause identifiers.

Next, in one or more of the various embodiments, control may be returned to a calling process.

FIG. 9 illustrates a flowchart of process 900 for representing documents using document keys in accordance with one or more of the various embodiments. After a start block, at block 902, in one or more of the various embodiments, one or more documents may be selected for analysis. As described above, analysis engines may be arranged to provide one or more user interfaces that enable analysts to select one or more documents for analysis. Accordingly, in some embodiments, document engines may be arranged to provide indexes or databases that associate the document keys with corresponding source documents. Likewise, in some embodiments, document engines may be arranged to provide similar indexes or databases that enable clause identifiers to be mapped to corresponding source clauses.

In some embodiments, analysis engines may be arranged to execute one or more automatically/ongoing analysis on one or more portions of the documents that may be under management of document engines, or the like. For example, in some embodiments, analysis engines may be arranged to automatically select documents to identify documents that may be associated with one or more erroneous condition or features, such as unwanted duplicates, incomplete documents, unexpected divergent documents with unexpected differences or anomalies, or the like.

At block 904, in one or more of the various embodiments, document engines may be arranged to determine the document keys associated with the provided documents. As described above, document engines may execute one or more actions to determine clause identifiers for the clauses comprising the documents being analyzed. Likewise, as described above, document engines may be arranged to combine the clause identifiers from a document into document keys.

In some embodiments, document engines may be arranged to automatically generate document keys for documents before they may be selected for analysis. For example, in some embodiments, a document engine may be configured to automatically generate clause identifiers and document keys for some or all documents as they may be added to the document analysis platform.

At block 906, in one or more of the various embodiments, analysis engines may be arranged to execute one or more actions to conduct analysis of the one or more documents.

In one or more of the various embodiments, analysis engines may be arranged to provide user interfaces that list or display various analysis operations that may be available. In some embodiments, analysis engines may be arranged to enable the available analysis operations to be restricted or otherwise protected based on user access rights, user roles, or the like. Likewise, in some embodiments, access to documents, document keys, clause identifiers, or the like, may be similarly restricted. For example, in some embodiments, analysis of documents that may be associated with confidential or sensitive subject matter may be restricted to particular users, user roles, or the like. Also, for example, one or more kinds of analysis may be restricted similarly.

However, in some embodiments, performing analysis limited to document keys may be additionally advantageous because the analysis may be conducted without providing the raw documents to the persons conducting the analysis.

One of ordinary skill in the art, will appreciate that analysis engines are not limited to performing a fixed or limited set of analysis operations. As analysts raise new questions, new analysis techniques that employ document keys or clause identifiers may be identified and employed. Accordingly, in some embodiments, analysis engines may be arranged to provide analysis operations that may employ rules, instructions, machine-learning models, libraries, or the like, that may be provided by configuration information to account for local requirements or local circumstances. For example, if a new or different class of documents is added to a document management platform, new analysis operations directed to the new class of documents may be developed and made available to analysis engines.

As described above, in some embodiments, analysis engines may be arranged to perform one or more actions to document keys that may facilitate analysis techniques including vectorization of document keys. Such actions may be employed to convert document keys into numerical representations suitable for various data analytics.

At block 908, in one or more of the various embodiments, analysis engines may be arranged to generate one or more reports based on the results of the analysis. As described above, reports may include interactive dashboards, conventional hard-copy report documents, data files, log files, interactive reports, or the like. In some embodiments, report 414 may include generating one or more events or notifications based on the results of a given analysis.

Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing documents over a network using one or more processors that execute instructions to perform steps, comprising:
   providing one or more documents that include one or more clauses;
   determining each clause type for the one or more clauses in the one or more documents based on one or more classification models;
   associating one or more clause identifiers with the one or more clauses based on one or more clause types of each clause;
   generating a document key for each document based on an ordered collection of the one or more clauses included in each document, wherein each clause identifier is positioned in the document key based on an order of its location in a corresponding clause of a document;
   analyzing the one or more documents based on one or more comparisons of one or more document keys corresponding to the one or more documents, wherein the analysis performs actions, including:
      generating one or more vectors based on the one or more document keys, wherein each element of the one or more vectors corresponds to a clause identifier, and wherein each element of the one or more vectors is a real number; and
      determining one or more distance values between one or more pairs of the one or more vectors; and
      determining a similarity score for the one or more documents based the one or more distance values; and
   generating one or more reports based on one or more results of the analysis.

2. The method of claim 1, wherein generating the document key for each document, further comprises:
   determining one or more clause identifier groups based on a portion of the one or more clause identifiers that are contiguously positioned in the document key; and
   classifying the one or more documents based on the one or more clause identifier groups included in the one or more document keys.

3. The method of claim 1, wherein associating the one or more clause identifiers with the one or more clauses, further comprises:
   determining one or more characteristics of the one or more documents, wherein the one or more characteristics, include one or more of format, style, font, structural information, layout information, document meta-data, tables, or figures; and providing one or more other clause identifiers that correspond to the one or more characteristics, wherein the one or more other clause identifiers are included in the one or more document keys.

4. The method of claim 1, wherein analyzing the one or more documents, further comprises:

determining one or more changes to the one or more document keys that occur at different times during a lifetime of the one or more documents; and determining one or more changes to the one or more document that occur at different times during the lifetime of the document based on the one or more changes to the one or more document keys.

5. The method of claim 1, wherein generating the document key for each document, further comprises:

determining one or more portions of the one or more documents, wherein each portion is one or more of a section of the one or more documents, a chapter of the one or more documents, or a page of the one or more documents; and generating another document key for each portion of the one or more documents that include one or more other clause identifiers that correspond to one or more other clauses in the one or more portions of the one or more documents.

6. The method of claim 1, wherein determining each clause type for the one or more clauses in the one or more documents, further comprises:

determining one or more of a rule, an instruction, a heuristic, a trained machine-learning classifier, or a regular expression based on the one or more classification models;

employing the one or more of the rule, the instruction, the heuristic, the trained machine-learning classifier, or the regular expression to determine each clause type of the one or more clauses in the one or more documents; and mapping each clause type of the one or more clauses to the one or more clause identifiers.

7. The method of claim 1, further comprising:

generating one or more other document keys for the one or more documents, wherein the one or more other document keys include one or more other clause identifiers that correspond to one or more other characteristics of the one or more clauses that are different than one or more characteristics that correspond to the one or more clause identifiers.

8. A system for managing documents comprising:

a network computer, comprising:
 a memory that stores at least instructions; and
 one or more processors that execute instructions that perform actions, including:
  providing one or more documents that include one or more clauses;
  determining each clause type for the one or more clauses in the one or more documents based on one or more classification models;
  associating one or more clause identifiers with the one or more clauses based on one or more clause types of each clause;
  generating a document key for each document based on an ordered collection of the one or more clauses included in each document, wherein each clause identifier is positioned in the document key based on an order of its location in a corresponding clause of a document;
  analyzing the one or more documents based on one or more comparisons of one or more document keys corresponding to the one or more documents, wherein the analysis performs actions, including:
   generating one or more vectors based on the one or more document keys, wherein each element of the one or more vectors corresponds to a clause identifier, and wherein each element of the one or more vectors is a real number; and
   determining one or more distance values between one or more pairs of the one or more vectors; and
   determining a similarity score for the one or more documents based the one or more distance values; and
  generating one or more reports based on one or more results of the analysis; and
a client computer, comprising:
 a memory that stores at least instructions; and
 one or more processors that execute instructions that perform actions, including:
  providing the one or more documents; or
  display the one or more reports.

9. The system of claim 8, wherein generating the document key for each document, further comprises:

determining one or more clause identifier groups based on a portion of the one or more clause identifiers that are contiguously positioned in the document key; and classifying the one or more documents based on the one or more clause identifier groups included in the one or more document keys.

10. The system of claim 8, wherein associating the one or more clause identifiers with the one or more clauses, further comprises:

determining one or more characteristics of the one or more documents, wherein the one or more features, include one or more of format, style, font, structural information, layout information, document meta-data, tables, or figures; and providing one or more other clause identifiers that correspond to the one or more characteristics, wherein the one or more other clause identifiers are included in the one or more document keys.

11. The system of claim 8, wherein analyzing the one or more documents, further comprises:

determining one or more changes to the one or more document keys that occur at different times during a lifetime of the one or more documents; and determining one or more changes to the one or more document that occur at different times during the lifetime of the document based on the one or more changes to the one or more document keys.

12. The system of claim 8, wherein generating the document key for each document, further comprises:

determining one or more portions of the one or more documents, wherein each portion is one or more of a section of the one or more documents, a chapter of the one or more documents, or a page of the one or more documents; and generating another document key for each portion of the one or more documents that include one or more other clause identifiers that correspond to one or more other clauses in the one or more portions of the one or more documents.

13. The system of claim 8, wherein determining each clause type for the one or more clauses in the one or more documents, further comprises:
- determining one or more of a rule, an instruction, a heuristic, a trained machine-learning classifier, or a regular expression based on the one or more classification models;
- employing the one or more of the rule, the instruction, the heuristic, the trained machine-learning classifier, or the regular expression to determine each clause type of the one or more clauses in the one or more documents; and
- mapping each clause type of the one or more clauses to the one or more clause identifiers.

14. The system of claim 8, wherein the one or more processors of the network computer execute instructions that perform further comprising:
- generating one or more other document keys for the one or more documents, wherein the one or more other document keys include one or more other clause identifiers that correspond to one or more other characteristics of the one or more clauses that are different than one or more characteristics that correspond to the one or more clause identifiers.

15. A processor readable non-transitory storage media that includes instructions for managing documents, wherein execution of the instructions by one or more processors on one or more network computers performs actions, comprising:
- providing one or more documents that include one or more clauses;
- determining each clause type for the one or more clauses in the one or more documents based on one or more classification models;
- associating one or more clause identifiers with the one or more clauses based on one or more clause types of each clause;
- generating a document key for each document based on an ordered collection of the one or more clauses included in each document, wherein each clause identifier is positioned in the document key based on an order of its location in a corresponding clause of a document;
- analyzing the one or more documents based on one or more comparisons of one or more document keys corresponding to the one or more documents, wherein the analysis performs actions, including:
  - generating one or more vectors based on the one or more document keys, wherein each element of the one or more vectors corresponds to a clause identifier, and wherein each element of the one or more vectors is a real number; and
  - determining one or more distance values between one or more pairs of the one or more vectors; and
  - determining a similarity score for the one or more documents based the one or more distance values; and
- generating one or more reports based on one or more results of the analysis.

16. The media of claim 15, wherein generating the document key for each document, further comprises:
- determining one or more clause identifier groups based on a portion of the one or more clause identifiers that are contiguously positioned in the document key; and
- classifying the one or more documents based on the one or more clause identifier groups included in the one or more document keys.

17. The media of claim 15, wherein associating the one or more clause identifiers with the one or more clauses, further comprises:
- determining one or more features of the one or more documents, wherein the one or more characteristics, include one or more of format, style, font, structural information, layout information, document meta-data, tables, or figures; and
- providing one or more other clause identifiers that correspond to the one or more characteristics, wherein the one or more other clause identifiers are included in the one or more document keys.

18. The media of claim 15, wherein analyzing the one or more documents, further comprises:
- determining one or more changes to the one or more document keys that occur at different times during a lifetime of the one or more documents; and
- determining one or more changes to the one or more document that occur at different times during the lifetime of the document based on the one or more changes to the one or more document keys.

19. The media of claim 15, wherein generating the document key for each document, further comprises:
- determining one or more portions of the one or more documents, wherein each portion is one or more of a section of the one or more documents, a chapter of the one or more documents, or a page of the one or more documents; and
- generating another document key for each portion of the one or more documents that include one or more other clause identifiers that correspond to one or more other clauses in the one or more portions of the one or more documents.

20. The media of claim 15, wherein determining each clause type for the one or more clauses in the one or more documents, further comprises:
- determining one or more of a rule, an instruction, a heuristic, a trained machine-learning classifier, or a regular expression based on the one or more classification models;
- employing the one or more of the rule, the instruction, the heuristic, the trained machine-learning classifier, or the regular expression to determine each clause type of the one or more clauses in the one or more documents; and
- mapping each clause type of the one or more clauses to the one or more clause identifiers.

21. A network computer for managing documents, comprising:
- a memory that stores at least instructions; and
- one or more processors that execute instructions that perform actions, including:
  - providing one or more documents that include one or more clauses;
  - determining each clause type for the one or more clauses in the one or more documents based on one or more classification models;
  - associating one or more clause identifiers with the one or more clauses based on one or more clause types of each clause;
  - generating a document key for each document based on an ordered collection of the one or more clauses included in each document, wherein each clause identifier is positioned in the document key based on an order of its location in a corresponding clause of a document;
  - analyzing the one or more documents based on one or more comparisons of one or more document keys corresponding to the one or more documents, wherein the analysis performs actions, including:

generating one or more vectors based on the one or more document keys, wherein each element of the one or more vectors corresponds to a clause identifier, and wherein each element of the one or more vectors is a real number; and determining one or more distance values between one or more pairs of the one or more vectors; and determining a similarity score for the one or more documents based the one or more distance values; and generating one or more reports based on one or more results of the analysis.

22. The network computer of claim 21, wherein generating the document key for each document, further comprises:

determining one or more clause identifier groups based on a portion of the one or more clause identifiers that are contiguously positioned in the document key; and classifying the one or more documents based on the one or more clause identifier groups included in the one or more document keys.

23. The network computer of claim 21, wherein associating the one or more clause identifiers with the one or more clauses, further comprises:

determining one or more features of the one or more documents, wherein the one or more characteristics, include one or more of format, style, font, structural information, layout information, document meta-data, tables, or figures; and providing one or more other clause identifiers that correspond to the one or more characteristics, wherein the one or more other clause identifiers are included in the one or more document keys.

24. The network computer of claim 21, wherein analyzing the one or more documents, further comprises:

determining one or more changes to the one or more document keys that occur at different times during a lifetime of the one or more documents; and determining one or more changes to the one or more document that occur at different times during the lifetime of the document based on the one or more changes to the one or more document keys.

25. The network computer of claim 21, wherein generating the document key for each document, further comprises:

determining one or more portions of the one or more documents, wherein each portion is one or more of a section of the one or more documents, a chapter of the one or more documents, or a page of the one or more documents; and generating another document key for each portion of the one or more documents that include one or more other clause identifiers that correspond to one or more other clauses in the one or more portions of the one or more documents.

26. The network computer of claim 21, wherein the one or more processors execute instructions that perform further comprising:

generating one or more other document keys for the one or more documents, wherein the one or more other document keys include one or more other clause identifiers that correspond to one or more other characteristics of the one or more clauses that are different than one or more characteristics that correspond to the one or more clause identifiers.

\* \* \* \* \*